Patented May 22, 1928.

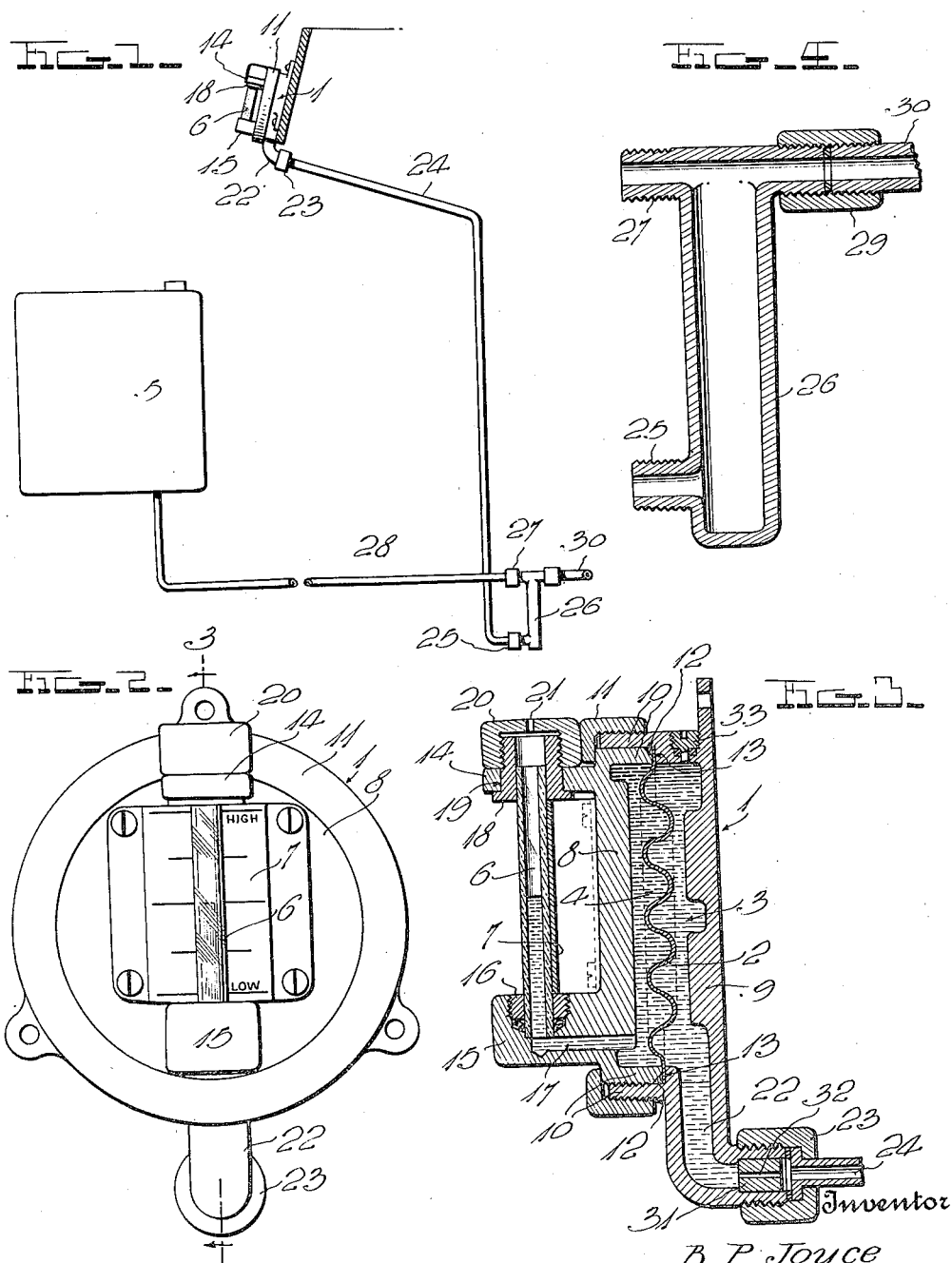

1,670,578

UNITED STATES PATENT OFFICE.

BRYAN P. JOYCE, OF DAVENPORT, IOWA.

LIQUID-LEVEL GAUGE.

Application filed April 6, 1925. Serial No. 21,190.

My invention relates to improvements in gauges used for determining the level of liquid in remote tanks or tanks which are not easily accessible, the device being primarily intended for use upon automobiles for determining the level of fuel in the fuel tank, whether the machine be of the gravity-fed type, or vacuum fed.

One object of the invention is to provide a new and improved form of indicator which is operated partially by gravity and partially by barometric pressure, and a further aim is to provide a novel, simple, inexpensive and efficient construction for effectively utilizing gravity and barometric pressure to vary the reading of the gauge, proportionately with variance of the liquid level in the tank.

A still further object is to make novel provision for damping the action of the indicator, that is, preventing excessive fluctuation thereof.

With the foregoing in view, the invention resides in the novel subject matter hereinafter described and claimed, the description being supplemented by the accompanying drawing.

Figure 1 is a side elevation showing the application of the invention to the fuel feeding system of a gravity-fed automobile.

Figure 2 is a face view of the indicator.

Figure 3 is a vertical sectional view on line 3—3 of Fig. 2.

Figure 4 is a sectional view through the liquid chamber which serves to prevent excessive fluctuation of the device.

The drawing above briefly described may be considered as disclosing the preferred form of construction, although variations can be made within the scope of the invention as claimed.

The numeral 1 designates, in a general way, a hollow body whose interior is divided by a flexible wall or diaphragm 2 into a pair of chambers 3 and 4. By a suitable passage, the chamber 3 is placed in communication with the liquid-containing portion of a tank 5, and said passage and chamber are entirely filled with liquid, and moreover, are sealed against the entrance of air.

The chamber 4 is in communication with a gauge glass 6, the point of communication being at the lower end of said gauge glass while the upper end of the latter is open to the atmosphere. This chamber 4 is also filled with liquid, the latter being adapted to rise to various distances in the gauge glass 6.

The body 1 must be located above the lowest liquid level of the tank 5, and in the present disclosure is located above the tank 5. There is thus the force of gravity, tending to equalize the levels of liquid in the tank and the chamber 3, exerting a force to move the diaphragm 2 toward said chamber 3, said force of course varying according to the level of liquid in the tank, and increasing proportionately with lowering of said level, and the level of the liquid in the gauge glass 6, is the indicating medium, such level co-operating with an appropriate scale 7.

In the preferred form of construction, the body 1 is formed of front and back plates 8 and 9 respectively, having annular flanges 10 telescoping with each other and held together by a ring nut 11, a gasket 12 being provided to establish an air-tight seal between the two sections of the body. The diaphragm 2, which is preferably of the corrugated type shown, is preferably secured in place between the plates 8 and 9, by having its edge portion clamped between the inner edge of one of the flanges 10, and an annular shoulder 13 formed on the other flange. Preferably, portions of the plates 8 and 9 are disposed in sufficiently close proximity to the diaphragm, to limit its movement in either direction, consequently limiting the rise and fall of the liquid in the gauge glass 6, to the high and low marks on the scale 7.

An upper lug 14 and a lower lug 15, are formed integrally with and project forwardly from the front plate 9, the lower end of the gauge glass 6 being suitably secured as at 16 in a recess in the upper side of said lug 15. This lug is also formed with a port 17 placing the gauge glass in communication with the chamber 4. A bushing 18 has been shown fitted within an opening 19 in the lug 14 and surrounding the upper end of the gauge glass to hold the latter in proper place. Threaded upon the upper end of this bushing, a cap 20 has been disclosed, provided with an opening 21 which permits air to freely enter and leave the glass 6.

I have shown the lower end of the back plate 9 formed with an integral neck 22 suitably coupled as at 23 with a pipe 24, the lower end of this pipe being coupled as at 25 to the lower end of a relatively large liquid containing casing 26. This casing is vertically elongated and at its upper end is coupled at 27 with a tube 28 leading from the tank 5, the upper end of the casing 26 being also connected at 29 with the fuel intake 30 of a carbureter, in the present showing. This arrangement is used when the carbureter is supplied by gravity, and when the indicator is to be operated in connection with a vacuum-fed machine, the casing 26 will of course be coupled to the gas line leading to the vacuum tank. The casing 26 contains such an amount of fuel, that such fuel is practically unaffected by the flow of fuel to the carbureter, so that the pressure within the chamber 3 is not continually pulsating, but can only slowly change, as the level in the tank 5 varies.

To further assist in preventing undue fluctuation or pulsation of the diaphragm 2, and consequent fluctuation of the liquid in the gauge glass 6, I prefer to provide a plug 31 in the neck 22, said plug having a small port 32 through which the liquid must pass. The size of this port is such that the liquid cannot rush rapidly through it in either direction, to have an undesirable, quick action upon the diaphragm 2.

The chamber 4 is filled with any suitable liquid, preferably colored, and one which will not easily evaporate and possesses low viscosity, is preferably employed. This liquid may be introduced in any convenient manner, the air being of course exhausted from the chamber 4 as the liquid is admitted. The chamber 3 and its communicating means with the tank, are totally filled with the same liquid as that contained by the tank, and for the purpose of exhausting the air from these parts to effect filling thereof, I have shown a plug 33 in Fig. 3. This plug is of course air-tight when replaced after filling of the system, and as no air can enter the chamber 3, all liquid cannot gravitate therefrom, even should the tank 5 be entirely emptied. The infinitesimal quantity of liquid which will run from the pipe 24 under such a condition, is received in the casing 26 and entrapped therein, so that the lower end of the pipe 24 is never uncovered to permit entrance of air.

The parts of the device are so related that when the tank 5 is full of liquid, the diaphragm 2 bears against the inner side of the front plate 8 and the liquid level in the gauge glass 6 is then at the highest point on the scale 7. As the level in the tank 5 lowers, the liquid in the chamber 3 and pipe 24 have a tendency to lower also by gravity, thus shifting the diaphragm toward the back plate 9, enlarging the chamber 4 and permitting the barometric pressure on the liquid in the gauge glass 6, to drive such liquid from the glass in sufficient quantity to always keep the chamber 4 full, regardless of the size to which this chamber is enlarged by movement of the diaphragm 2. By the time the liquid level in the tank 5 has lowered to a serious extent, the diaphragm 2 has moved until the chamber 4 is enlarged to the maximum and the level of the liquid in the gauge glass 6 is at the low point on the scale 7. The diaphragm 2 then rests against the inner side of the back plate 9.

Excellent results are obtainable from the details disclosed and they are therefore preferably followed. However, within the scope of the invention as claimed, numerous modifications may be made.

I claim:—

In a liquid level gauge operated partly by barometric pressure and partly by gravity, the combination with a liquid tank, of a liquid-filled chamber above the lowest liquid level of said tank and having a movable wall, a liquid-filled tube placing said chamber in communication with the liquid containing portion of the tank, a portion of said tube being reduced for throttling, said liquid-filled chamber and liquid-filled tube being sealed against entrance of air, a portion of said tube being below its point of communication with the tank in order that barometric pressure may keep the chamber and tube full of liquid, both sides of said movable wall being subjected to barometric pressure, means for limiting the movement of the movable wall, and means for indicating the movement of said movable wall, together with a carbureter feed tube connected with and communicating with the first-named tube, said portion of said first-named tube below its point of communication with the tank, including a relatively large chamber at the connection of the two tubes, said chamber being in free open communication with both of said tubes and containing the same liquid as the latter, said chamber being adapted to prevent excessive fluctuation of said movable wall by flow of fuel to the carbureter.

In testimony whereof I have hereunto affixed my signature.

BRYAN P. JOYCE.